(12) United States Patent
Sasame et al.

(10) Patent No.: US 7,682,643 B2
(45) Date of Patent: Mar. 23, 2010

(54) METHOD FOR MANUFACTURING CONTAINERED GREEN TEA BEVERAGE

(75) Inventors: Masami Sasame, Shizuoka (JP); Hitoshi Kinugasa, Shizuoka (JP); Kenji Shimaoka, Shizuoka (JP); Yoko Haraguchi, Shizuoka (JP); Hitoshi Niino, Shizuoka (JP); Kazunori Okanoya, Shizuoka (JP)

(73) Assignee: Ito En, Ltd., Tokyo (JP)

( * ) Notice: Subject to any disclaimer, the term of this patent is extended or adjusted under 35 U.S.C. 154(b) by 1060 days.

(21) Appl. No.: 10/831,316

(22) Filed: Apr. 26, 2004

(65) Prior Publication Data

US 2005/0186314 A1 Aug. 25, 2005

(30) Foreign Application Priority Data

Feb. 19, 2004 (JP) .......................... P2004-043606

(51) Int. Cl.
*A23C 3/00* (2006.01)
(52) U.S. Cl. .......................... 426/597; 426/435; 426/423
(58) Field of Classification Search ................. 426/597, 426/435, 423
See application file for complete search history.

(56) References Cited

U.S. PATENT DOCUMENTS 4,324,840 A * 4/1982 Katz .......................... 426/422

FOREIGN PATENT DOCUMENTS

| GB | 1319439 | * | 6/1973 |
| JP | 62-278948 A | | 3/1987 |
| JP | 62-278949 A | | 3/1987 |
| JP | 4-49227 | * | 2/1992 |
| JP | 04-311348 A | | 11/1992 |
| JP | 4-311348 A | | 11/1992 |
| JP | 5-168407 | * | 7/1993 |
| JP | 6-269246 A | | 9/1994 |
| JP | 06-269246 A | | 9/1994 |
| JP | 06-311847 A | | 11/1994 |
| JP | 08-228684 A | | 9/1996 |
| JP | 09-172969 | | 7/1997 |
| JP | 2000-189055 | | 7/2000 |
| JP | 2000-189055 | | 11/2000 |
| JP | 2001-045973 A | | 2/2001 |

(Continued)

OTHER PUBLICATIONS

Okuda. Novel Aspects of Tannins. Current Organic Chemistry. 1999. vol. 3. p. 609.*

(Continued)

*Primary Examiner*—Anthony Weier
(74) *Attorney, Agent, or Firm*—Sughrue Mion, PLLC

(57) ABSTRACT

To provide a new manufacturing method of containered green tea beverage suited for selling hot. A step of eliminating silica was introduced in the manufacturing process, wherein the silica is eliminated after adding silica to a tea extract obtained by extracting green tea leaves to adsorb the sediment component present in tea extract to the silica. By adding silica to the tea extract and bringing them into contact, the proteins and polysaccharides causing secondary sediment can be selectively adsorbed and decreased, allowing the occurrence of sediment to be prevented, even when selling the beverage hot. Furthermore, it allows a large amount of flavor component to be left. Further more, a large amount of catechins can be left in the beverage, allowing the growth of heat-resistant bacteria to be inhibited by the antibacterial action of catechins.

10 Claims, 2 Drawing Sheets

FOREIGN PATENT DOCUMENTS

| | | | |
|---|---|---|---|
| JP | 2001-204386 A | | 7/2001 |
| JP | 2005-124500 | | 5/2005 |
| JP | 2005-137286 | | 6/2005 |
| KR | 970010219 | * | 6/1997 |
| SU | 1409200 | * | 7/1988 |

OTHER PUBLICATIONS

Ninno et al. Jounral of Agricultural and Food Chemistry. 2005. vol. 3. pp. 3995-3999.*

Muraki, et al., Development of Purified and Zeolite-coated Filter Aids, vol. 43, No. 2, pp. 76-82, dated Aug. 1996.

Saruta, et al., Separation of Impurities for Advanced Utilization of Diatomaceous Earth, No. 17, dated Oct. 17, 1996, pp. 15-22.

Saruta, et al., Separation of Impurities for Advanced Utilization of Diatomaceous Earth, No. 17, dated Oct. 17, 1996, pp. 15-22.

Muraki, et al., Development and Current Status of High-Quality Filtration Aid, vol. 43, No. 2, pp. 76-82, dated Aug. 1996.

* cited by examiner

METHOD FOR MANUFACTURING
CONTAINERED GREEN TEA BEVERAGE

TECHNICAL FIELD

The present invention relates to a method for manufacturing containered green tea beverage wherein no sediments occur even after a long-term conservation; it relates particularly to a method for manufacturing containered green tea beverage suitable for selling hot.

BACKGROUND OF THE INVENTION

Sometimes, during conservation, after filling a container with green tea beverage, a floating, cloudy, flocky (flocculent) or precipitate-like sediment (hereinafter, these will be collectively referred to as simply "sediment") occurs. For green tea beverages filled in transparent containers, the occurrence of such type of sediment is as important an issue as it can lead to the loss of its market value.

Although generally referred to as "sediment," it can be divided into "primary sediment," which starts precipitating immediately after manufacturing the beverage, and "secondary sediment," which occurs gradually with time after manufacturing the beverage, during storage. Among these, primary sediment is generally referred to as tea cream, which has been confirmed to be generated by binding of caffeine, tea flavin, and the like, and has been verified to be preventable by performing centrifugation, enzymatic treatment, membrane filtration, and the like in combination. On the other hand, secondary sediment is a greater problem than primary sediment, for which various preventive methods have been proposed in the prior art.

A method for eliminating the substance causing the sediment has been proposed as one preventive method of secondary sediment. For instance, a method has been disclosed wherein tea is extracted with warm water, the obtained tea extract is cooled prior to adding tannic acid and let to stand still, followed by centrifugation and the like to remove fine tea particulates, and thereafter clarified by kieselguhr filtration (Japanese unexamined patent publication No. H6-269246).

In addition, a method has been disclosed wherein tea extract resulting from the extraction of green tea is acidified by adding ascorbic acid, then rapidly cooled and centrifuged prior to performing kieselguhr filtration for clarification (Japanese examined patent publication No. H7-97965).

Furthermore, a method has been disclosed wherein chitosan is added to a tea extract of a water-soluble tea component obtained by extracting green tea with water or hot water, macromolecular component polyphenols are sponged by adsorption, then this is processed by a centrifuge and further kieselguhr-filtrated to eliminate generation of precipitates (Japanese unexamined patent publication No. H6-311847).

In addition, a method has been proposed wherein a chemical reagent, an enzyme, and the like are added to solubilize or stabilize insoluble complexes (sediments). For instance, a method that effectively inhibits the occurrence of secondary precipitation in green tea beverages, wherein the warm-water tea extract from green tea is centrifuged or cloth-filtered, combined with a step wherein an enzyme having hemi-cellulase activity is further added (Japanese unexamined patent publication No. H8-228684), a method that inhibits the occurrence of flocks in beverages by adding α-amylase to the green tea extract (Japanese unexamined patent publication No. 2001-45973), a method for manufacturing green tea beverages wherein enzymatically treated lecithin, such as lysolecithin, is added to and mixed with the green tea extract to inhibit the occurrence of opacification or precipitations (Japanese unexamined patent publication No. 2001-204386), and the like have been disclosed.

However, the methods that intend to prevent secondary sediments by removing the substances causing the sediments bear the problem that since they ultimately eliminate all the substances causing opacification/precipitation contained in green tea beverages, ingredients that influence tea flavor and are not involved in sediment formation are also eliminated in large quantities, weakening the original flavor of the tea.

In addition, methods that solubilize or stabilize insoluble complexes by adding chemical reagents or enzymes have the problem that the original flavor of the tea is altered by the reaction between the additives and the contained ingredients.

SUMMARY OF THE INVENTION

In recent years, around the winter season, containered green tea beverages have been sold heated at approximately 55-60° C. We newly discovered that if green tea beverages are stored heated, secondary sediment occurs far more easily. Furthermore, we have also newly discovered that by selling heated at 55-60° C., rancidity due to thermophilic bacteria and alteration of flavor due to thermal denaturation can arise.

Thus, the present invention provides a new method for manufacturing a containered green tea beverage that is clear over a long period and furthermore maintains the original flavor of the tea, and particularly suited to containered green tea for selling hot.

The present invention proposes a method for manufacturing containered green tea beverage comprising an extraction step wherein green tea leaves are extracted in heated water at 70-100° C., an adsorption step wherein silica is added to the obtained tea extract to adsorb sediment component present in the tea extract to the silica, a silica elimination step wherein the silica is eliminated from the tea extract, a heat sterilization step, and a container filling step.

The above silica elimination step may be combined with a filtration step, or the silica elimination step may be established separately from the filtration step. Specifically, the added silica may be removed from the tea extract together with the unwanted substance by a method that may separate solid state particulates from a liquid using centrifugation, ultrafiltration, fine filtration, microfiltration, reverse osmosis membrane filtration, electrodialysis, membrane filtration with biologically functional membrane and the like, or other porous media (filter element), or a filtration method that combines any two types among these, or filtration may be carried out by a method wherein silica is eliminated by any filtration method (for instance a filtration method mentioned above), then filtration is performed separately by a method that may separate solid state particulates from a liquid using centrifugation, ultrafiltration, fine filtration, microfiltration, reverse osmosis membrane filtration, electrodialysis, membrane filtration with biologically functional membrane and the like, or other porous media (filter element).

In the present invention, the order of the steps may be changed, such as, for instance, swapping the sequence of the sterilization step and the container filling step; in addition, other steps may be inserted.

As a result of intensive investigation on methods for preventing sediments in tea beverages (including primary and secondary sediments), the present inventors discovered that by adding silica to and making contact with the tea extract, the sediment components contained in the tea extract, specifically, a portion of proteins and polysaccharides that form secondary sediments, could be selectively adsorbed to the silica and, based on such observations, achieved the present invention. Conventionally, the cause of secondary sediment occurrence during conservation of green tea beverages was considered to be the proportion of macromolecular components in the formulation. Therefore, in a number of methods for removing the substance that causes sediment, all the macromolecule-containing components were removed as a result. However, since a number of components having an influence on the flavor of the tea are included among the macromolecule-containing components, although occurrence of sediment can be prevented according to the conventional method, original flavor of the tea is weakened. In contrast, in the present invention, since the portion of proteins and polysaccharides that form secondary sediments can be selectively adsorbed to silica and removed, the content thereof can be decreased; simultaneously, flavor components that do not participate in the occurrence of sediment can be left in the tea extract in large amounts. Consequently, manufacturing of a containered green tea beverage that is clear over a long period, and furthermore, wherein the original flavor of the tea is maintained, is possible.

Regarding the cause of secondary sediment, a recent report describes that strictinin, present in tea extract or tea formulation solution, is decomposed into ellagic acid by heat sterilization, this ellagic acid binding to proteins, polysaccharides, and the like form secondary sediment (see Japanese unexamined patent publication No. 2003-235452 and the like). From this point of view, it can be considered that the present invention can intensively select and remove from the tea extract the components that are the true causes of secondary sediment, by adding silica to green tea extract and selectively adsorbing to silica proteins and polysaccharides that bind to ellagic acid.

The manufacturing method of the present invention is particularly suited to the manufacturing of a containered green tea beverage for selling hot. In sales of hot beverages, beverages are stored and sold hot at 55-60° C., in general. If green tea beverages are stored in a heated state, secondary sediment occurs far more easily; however, according to the manufacturing method of the present invention, protein and polysaccharides that form secondary sediment can be selectively adsorbed and removed, allowing the manufacturing of a green tea beverage that stays clear over a long period.

In addition, in case beverages are sold hot at 55-60° C., multiplication of thermophilic bacteria (heat-resistant thermophilic bacteria) that do not proliferate at normal temperature becomes problematic in conventional green tea beverages. According to the manufacturing method of the present invention, since catechins, which have antibacterial activity and present in the tea extract, can be left in the beverage, growth of heat-resistant bacteria can be inhibited by this antibacterial catechin activity. Regarding this point, with methods that adsorb aforementioned polyphenol, the amount of catechins becomes small; in addition, excessive organic species remain with methods that use decomposition by aforementioned enzyme and the like.

In addition, there is the issue that in conventional green tea beverages, if sold hot at 55-60° C., heat denaturation and deterioration by oxygen are accelerated, and when deterioration by heat proceeds, a potato-like, unpleasant odor is smelled. In the manufacturing method of the present invention, it has been found that fatty acid oxidative decomposition products, which are responsible for the odor degradation, can be selectively reduced. Meanwhile, it has been also found that roast aroma components, such as pyrazine, can be left in the beverage in large amounts, such that highly flavored green tea beverage wherein sharp roast aroma is smelled can be provided with little unpleasant aroma when drinking hot.

From the standpoint of the flavor, the perception of the human palate is known to change with temperature. Perception of bitterness and astringency are said to be less sharp when the temperature is high, and sweetness is said to be more easily tasted if the temperature is higher. However, according to the manufacturing method of the present invention, since the astringency component, catechin, and roast aroma component can be definitely left in the beverage and unpleasant potato odor can be suppressed, a green tea beverage particularly suitable for selling hot can be provided.

In addition, in the present invention, "green tea beverage" means a beverage whose main raw material is a tea extract obtained by extracting green tea leaves. Tea beverages, such as Oolong tea beverage, black tea beverage, and the like, where secondary sediment does not occur easily, are not preferred as subject tea beverages of the present invention.

In addition, in the present invention, "secondary sediment" means flocky (flocculent) precipitates that do not include fine powder precipitation, and should be distinguished from "primary sediment." In addition, precipitation of particulates that is not flocky is seen in beverages that have grapes as a source, such as wine, which it should also be distinguished from.

DETAILED DESCRIPTION OF THE INVENTION

Figure 1:
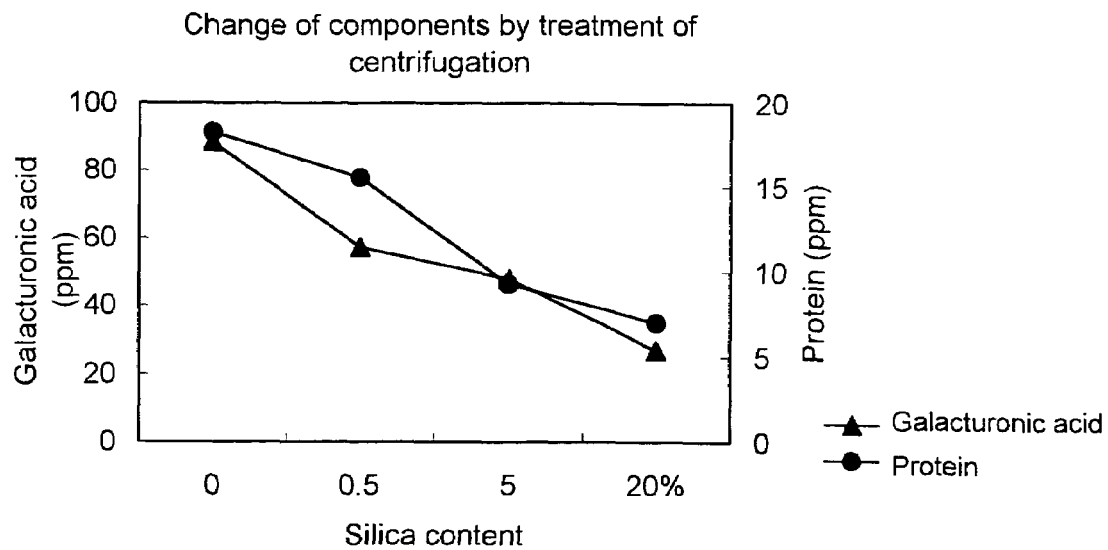
FIG. 1 is a graph showing the amounts of galacturonic acid and protein in a green tea beverage manufactured by centrifugation after the adsorption step, as a function of the amount of silica added.

The preferred embodiment to carry out the present invention will be described in the following; however, the embodiment of the present invention is not limited to the example below. Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

In the present embodiment, a containered green tea beverage is manufactured through an extraction step wherein a green tea leaf is extracted in hot water, a coarse filtration step wherein extraction residues are removed from the tea extract, an adsorption step wherein silica is added to the tea extract and sediment component in the tea extract is adsorbed to the silica, a filtration step (doubling as a silica elimination step) including a centrifugation and kieselguhr filtration, a formulation step, a heat sterilization step, and a container filling step.

However, the manufacturing process is just one example. The order of each step can be changed; in addition, another step can be inserted between each step. For instance, in the present manufacturing process, although the added silica is removed from the tea extract by centrifugation, a filtration may be inserted prior to the centrifugation, to remove the added silica from the tea extract.

(Raw Material)

Any tea species is applicable as green tea leaves as raw materials, that is the raw tea leaves if the leaf was picked from a tea plant (scientific name: *Camellia sinensis*) with no limitation as to its variety, locality, picking period, picking method, cultivating method, and the like. Fresh tea leaves and the like (including leaf and stem) are also applicable as raw tea leaves. Further, any kind of crude tea processed by the crude tea process wherein the enzymatic activity is stopped by steaming or roasting the fresh tea leaves and the like, such as Sen-cha, Kamairi-cha, Kabuse-cha, Gyokuro, Ten-cha, Matcha, Ban-cha, Houji-cha, steamed Tamaryoku-cha, pan-fired Tamaryoku-cha, Ureshino-cha, Aoyagi-cha, and the like, is applicable as the raw tea leaves. In addition, two or more of these crude teas may be combined, and a flavor may also be added for fabrication. In addition, a light-fermented tea, such as Jasmine tea, is also applicable. Several kinds of Jasmin tea exist; however, among those that are fabricated by addition of artificial flavor in green tea, those that are classified as non-fermented teas are preferred. Refined tea obtained by performing currently well-known finish processing on the above-mentioned crude tea can also be used as raw tea leaves.

On the other hand, semi-fermented tea, such as Oolong tea and Tekkannon-cha, fermented tea, such as black tea, post-heating fermented tea, such as Pu-erh tea, are not preferable as raw tea leaves of the present invention. This is because the tea cream occurring in Oolong tea and black tea, semi-fermented and fermented tea, and the irreversible flocky sediment (that is, secondary sediment) occurring in green tea, non-fermented tea have different causes.

(Extraction Step)

Extraction of green tea leaves may be by extracting in hot water at 70-100° C. For instance, extraction may be performed according to the conventional method using an extractor called a kneader with 20-100 times of extraction water, with respect to the raw tea, at 70-100° C., under an atmospheric pressure for approximately 1-20 minutes, stirring one to several times as necessary. However, extraction methods and extraction conditions and the like are not limited in particular; for instance, pressurized extraction can also be carried out.

In addition, the temperature of the hot water for extraction, is 70-100° C.; particularly preferable, extraction may be performed with hot water at 70-90° C., where desired flavor is more easily obtained, and astringency is not enhanced.

In addition to pure water (including hard water, soft water, and ion exchanged water), ascorbic acid-containing aqueous solution and pH-adjusted water and the like may be cited as examples of extraction.

It is preferred that the obtained tea extract is cooled as necessary to about 5-40° C., simultaneously, before, or after, and adjusted to be acidic (pH 4-5) by addition of ascorbic acid or sodium ascorbate and the like as necessary. By cooling or adjusting the acidity of the tea extract, oxidation of the extracted components can be prevented, while at the same time, components causing the primary sediment are precipitated, allowing the efficiency of the subsequent centrifugation step to be increased.

(Coarse Filtration Step)

The coarse filtration step is a step for eliminating extraction residues, such as tea leaves, large fine powder, and the like. For instance, stainless filter, flannel, strainer, and other filtration methods currently adopted to eliminate extraction residues may be optionally adopted.

Since the coarse filtration step is a step for eliminating large extraction residues and is a process that has no influence on the molecular weight distribution and the like of the tea beverage, this role may also be delegated to other filtration measures (centrifugation, kieselguhr filtration, in the present example), and the coarse filtration step may be omitted.

(Adsorption Step)

In the adsorption step, silica is added to the tea extract to bring the tea extract and silica into contact, the sediment component inside the tea extract is selectively adsorbed to silica, and the silica added in the present step is removed in the subsequent step.

In addition to silica (silicon dioxide; $SiO_2$), a silica-containing compounds as the principal component (occupying not less than 50% of the total mass) may be used as silica to be added.

Silica (silicon dioxide; SiO2) may be any of crystalline and noncrystalline silica. It may also be any of natural and synthetic silica. In case of synthetic silica, silica manufactured by any synthesis method, such as dry process (gas phase method), wet method (water glass method; including gel type and precipitation type), sol-gel method, and the like, can be used.

A silica-containing compound, for instance, clay minerals, such as silicic acid salt and kieselguhr, crystal, quartz, and the like, which are natural compounds, may be cited.

By adding silica to the tea extract and bringing the tea extract and silica into contact, the sediment component contained in the tea extract, particularly a portion of protein and polysaccharides forming the secondary sediment, can be selectively adsorbed to silica, allowing the concentration thereof in the tea extract to be decreased.

The amount of silica added is 0.5-20 times the amount of green tea source to be extracted (tea leaves' mass), and 1-10 times the amount thereof is particularly preferred.

In addition to the amount to be added, by controlling the particle diameter, the pore diameter, and electric charge of the silica and the hydroxyl groups or silanol groups present on the surface of the silica (silanol groups), to adjust the adsorption capability of silica and thereby the type and amount of proteins and polysaccharides to be eliminated by adsorption can be adjusted, making adjustment of the flavor of the green tea beverage can be possible.

As a specific adsorption method, for instance, silica may be added into the tea extract and agitated, or by adding silica into tea extract after coarse filtration and sending the tea extract together with the silica to the following step, tea extract and silica may be brought into contact in the liquid-sending process. Addition of silica may also be by dividing into several times for dispersion and adsorption.

In so doing, adding silica into the tea extract, then while cooling the tea extract to 20-40° C., bringing it into contact with the silica is preferred. If the tea extract is cooled to below 20° C., there is the concern that tea cream occurs, reducing the adsorption capability of the silica. On the other hand, if higher than 40° C., the tea extract can be denatured due to heat and lose the flavor.

Further, it is preferred to adjust the tea extract into which silica is to be added to a weak acidity range (pH 4.5-5.5). Alteration of catechins can be inhibited by adjusting to a weak acidity range. It is necessary to pay attention to the point that, if brought to lower than pH 4.5, there is the concern that tea cream occurs, reducing the adsorption capability of the silica.

To eliminate silica from the tea extract, a silica filtration step to remove silica may be inserted separately, or silica may be removed by centrifugation, kieselguhr filtration, or other filtration step, following the adsorption step.

(Centrifugation)

Centrifugation may be performed under the conditions of, for instance, a flow rate of 200-500 L/h and a rotation speed of 5000-20000 rpm; in so doing, by changing the flow rate, rotation speed, centrifugal sedimentation surface ($\Sigma$), and the like, the clarification degree (T %) of the containered green tea beverage obtained finally can be adjusted.

When centrifuging, cooling the tea extract beforehand to about 5-40° C. is preferred; however, cooling is not absolutely necessary.

Centrifugation is a process whereby fine powder is removed and allows the silica added, as mentioned above, to be removed.

If other processes exist whereby fine powder can be removed, centrifugation is not absolutely necessary; however, by centrifuging prior to kieselguhr filtration, the burden on kieselguhr filtration can be alleviated. For instance, the duration of the filtration can be shortened by increasing the permeation flow rate and decreasing the permeation pressure. However, since fine powder can also be removed by kieselguhr filtration, the burden is slightly greater; however, in case kieselguhr filtration is performed, centrifugation may also be omitted.

(Kieselguhr Filtration)

Kieselguhr filtration is a cake filtration that uses kieselguhr as a filtration aid.

Kieselguhr is earth resulting from phytoplanktons called diatoms deposited over many years at the bottom of the sea or lakes and fossilized, accumulating fine diatom clusters. The diameter is from several micrometers to several tens of micrometers, and owing to a multitude of 0.1-1.0 μm micropores that are present on the surface, clarified liquid is obtained upon filtration, by forming a compact cake layer of the filtration aid on a wire mesh or a filter cloth.

The principal component of kieselguhr is silica ($SiO_2$), particularly amorphous silica, and for filtration aid application, those that have been purified by firing are generally used.

A kieselguhr filtration method may be forming an aid layer comprised of kieselguhr on a filtration-supporting surface (precoating), injecting a kieselguhr filtration agent to the source solution (the tea extract as non-filtered solution) as necessary (body feeding), while simultaneously sending the source solution (the tea extract as non-filtered solution) to the previously-mentioned aid layer.

Here, "precoating" means, prior to filtration operation, dispersing the aid into a clear liquid, which is then circulated, and forming an aid layer that is several millimeters thick on the surface of a filtration support (for instance, metallic mesh (leaf), thick filter paper (filter pad), laminated metallic ring (candle), ceramic tube (candle), and the like), whereby the suspended solid portion from sediments is directly attached to the filter element, allowing contamination to be prevented and additionally the clarification degree of the filtrate to be improved.

For the kieselguhr used in the present invention, those kieselguhrs used as a filtration aid may be used, such as those from kieselguhr raw ore treated by grinding/desiccation, those from grinding/desiccation treatment further treated by firing or flux firing, although the use of kieselguhr filtration aids of 0.05-0.1 Darcy is preferred. A far more clear containered tea beverage can be manufactured by using kieselguhr filtration aid of 0.05-0.1 Darcy. Here, "kieselguhr filtration aid of 0.05-0.1 Darcy" means a kieselguhr filtration aid whose Darcy permeability K is in the 0.05-0.1 range. "Darcy permeability K" is one of the indicators that indicate the permeability of a filtration aid and can be determined by water permeation method or air permeation method. Currently, "Darcy" is such in general use that a kieselguhr filtration aid can be purchased by specifying this value.

In addition, for the kieselguhr used in the present invention, the use of kieselguhr wherefrom iron has been removed by elution via acid treatment is preferred. This is because iron not only influences the taste of green tea beverages, it is also the cause of browning. There is no particular restriction as far as kieselguhr acid treatment method is concerned, for instance, a method wherein kieselguhr and acidic water are brought into contact by any method, a method wherein kieselguhr and acidic water are fed into a mixing bath then agitated, a method wherein acid is added in a kieselguhr and water mixture inside a mixing bath then agitated, and the like, then washed with water after solid-liquid separation, and kieselguhr is used in a water-suspended state or while still in a soaked state, and the like may be adopted. Using kieselguhr in a water-suspended state or while still in a soaked state allows the iron eluted from kieselguhr to be lowered. Acidic water here is acidic water (aqueous solution wherein acid is present) of less than pH 7.0, preferably pH 1-5, and, for instance, aqueous solution of organic acid, such as citric acid, lactic acid, and acetic acid, inorganic acid, such as phosphoric acid, nitric acid, and hydrochloric acid, and the like can be cited.

Other filtration aids, such as silica gel, perlite, and cellulose, may be mixed with kieselguhr.

(Formulation)

In formulation, any among water (hard water, soft water, ion exchanged water, natural water, and so on), ascorbic acid, ascorbic acid sodium, sodium bicarbonate, saccharide, dextrin, flavor, emulsifier, stabilizer, or other flavoring ingredient and the like, or a combination of two or more among these, may be added and perform mainly pH adjustment, concentration adjustment, and taste adjustment. For instance, an example can be given wherein pH is adjusted to around 6 while Brix is adjusted to around 0.3.

(Sterilization and Container Filling)

Heat sterilization may be carried out by reheating (hot pack) as necessary, then filling and performing retort sterilization (for instance, heat sterilization is performed under appropriate pressure (1.2 mmHg and the like) for 7 minutes at 121° C.) in case of a canned beverage, by performing UHT sterilization (formulation solution is maintained at 120-150° C. for 1 second to several tens of seconds) in case of a plastic bottled beverage.

In the green tea beverage obtained in the present invention, an amount of galacturonic acid in the tea extract of 30-50 ppm is preferred, particularly of 35-45 ppm for selling hot, and/or an amount of protein in the tea extract of 6-10 ppm is preferred, particularly of 7-9 ppm for selling hot. Thus, it is preferred to take these as indicators for selecting and adjusting the type and the amount of silica to be added in the adsorption step. For the amounts of galacturonic acid and protein, the values measured in the same way as in the example are taken as the criteria.

Since galacturonic acid is a component that constitutes polysaccharides (pectins), which are one of the causes of the occurrence of sediment in green tea beverages, by measuring the amount of galacturonic acid contained in a green tea beverage, the total amount of pectins can be determined.

When application for selling hot is considered, a clarification degree of the green tea beverage of 93-98 T % transmittance (660 nm), particularly of 95-98 T %, is preferred. In so doing, the clarification degree of the green tea beverage can be adjusted by the filtration conditions, such as centrifugation and kieselguhr filtration. In this sense, if the clarification degree of the green tea beverage can be adjusted to 93-98 T % transmittance (660 nm), instead of centrifugation and kieselguhr filtration, other filtration methods, for instance, ultrafiltration, fine filtration, microfiltration, reverse osmosis membrane filtration, electrodialysis, membrane filtration through biologically functional membrane, and the like, or a filtration that combines any two or more types among these, can also be adopted. However, since tea beverages are prone to influence of oxygen deterioration, adoption of a total filtration scheme rather than the generally called cross-flow scheme performed in membrane filtration/ultrafiltration is preferred, and performing clarification filtration using a filtration aid, such as cake filtration using a filtration aid by combining with centrifugation, is suited from the point of flavor balance. Among them, in the present invention, kieselguhr filtration is excellent from the point of allowing high quality tea beverages to be manufactured stably, even without having the prevention of silica remaining in the filtrate or a particular technical experience.

In addition, the process for manufacturing green tea beverage through the above-mentioned manufacturing steps, that is, the extraction step, a coarse filtration step, an adsorption step, a filtration step containing centrifugation/kieselguhr filtration, a formulation step, a heat sterilization step, a container filling step, is just one example of the present invention, which is not limited thereto. For instance, the order of the steps can be changed, and other steps can also be added.

(Test 1: Quality Evaluation of Normal Temperature Conservation)

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, silica (noncrystalline hydrous silica; Mizusawa Industrial Chemicals, Ltd., Mizuka Soap) was added in various addition amounts (see Table 1), with respect to a green tea source (tea leaves' mass), into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds and immediately cooled.

The containered green tea beverage manufactured as above-mentioned was conserved for 2 weeks at room temperature, and the subsequent sediment occurrence situation was observed, as well as flavor evaluated.

Evaluation of the flavor was determined by an evaluation by 10 panelists.

The following criteria were used as indicators for the evaluation of sediment:

+++: Occurrence of large amounts of sediment

++: Occurrence of sediment

+: Occurrence of slight sediment

±: Occurrence of fine powder

−: No occurrence of sediment

Table 1

| Silica Content(%) | Flavor | Occurrence of sediment | Total evaluation |
| --- | --- | --- | --- |
| 0 | Rich | +++ | X |
| 0.3 | Rich | ++ | X |
| 0.5 | Rich | ± | Δ |
| 1 | Clear and good | − | ◯ |
| 5 | Clear and good | − | ◯ |
| 10 | Slightly weak but good | − | ◯ |
| 20 | Comparatively weak | − | Δ |
| 25 | Weak | − | X |

It was shown that by adding silica to tea extract and bringing them into contact, occurrence of sediment could be inhibited.

In particular, this effect was prominent when silica in the amounts of 0.5 times or more with respect to the green tea source (tea leaves' mass) was added and brought into contact.

On the other hand, it was shown that if an amount exceeding 20 times with respect to the green tea source (tea leaves' mass) is added, the flavor becomes weaker.

(Test 2: Quality Evaluation in the Case of Hot Storage)

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, silica (noncrystalline hydrous silica; Mizusawa Industrial Chemicals, Ltd., Mizuka Soap) was added in various addition amounts (see Table 2), with respect to the green tea source (tea leaves' mass), into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed while varying the flow rate between 200 and 400 L/h (rotation speed: 10000 rpm; centrifugal sedimentation surface (i): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled.

In addition, clarification degree (T %) of the containered green tea beverage was adjusted by altering the flow rate in the centrifugation.

The containered green tea beverage manufactured as mentioned above was conserved for 2 weeks in a thermostated bath at 55° C., and the status of sediment occurrence was observed after 7 and 14 days.

For the clarification degree (T %), the sample was thoroughly shaken, and the transmittance (660 nm) was measured.

A volume of 4.0 ml was sampled in a standard glass cell and measured with a measurement apparatus: Hitachi spectrophotometer U-3310.

T % was also measured for the tests mentioned below.

In addition, evaluation of sediment was performed as in Test 1.

was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to kieselguhr filtration, using kieselguhr of 0.1 Darcy, to obtain a kieselguhr-filtered solution.

Then, 300 ppm of ascorbic acid was added to the kieselguhr-filtered solution, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Table 2

| Silica Content (%) | T % |  |  |  |  |  |  |  |  |
|---|---|---|---|---|---|---|---|---|---|
|  | 82 | | 90 | | 93 | | 95 | | 98 | |
|  | Day 7 | Day 14 | Day 7 | Day 14 | Day 7 | Day 14 | Day 7 | Day 14 | Day 7 | Day 14 |
| 0 | +++ | +++ | +++ | +++ | ++ | +++ | ++ | ++ | + | ++ |
| 0.5 | +++ | +++ | ++ | +++ | ++ | ++ | + | ++ | + | + |
| 1 | ++ | ++ | + | + | ± | ± | − | − | − | − |
| 20 | + | + | − | − | − | − | − | − | − | − |

In case of hot storage, occurrence of sediment was seen, even if silica in the amount of 0.5 times or more, with respect to the green tea source (tea leaves' mass), was added; however, it was shown that by adjusting the centrifugation to increase the clarification degree (T %), occurrence of sediment can also be inhibited even in the case of hot storage.

(Test 3: Quality Evaluation by Filtration Method)

[Manufacturing Method 3-1]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, coarsely filtered tea extract was forcibly cooled to 30° C., let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, the solution was cooled inside a plate, and filled into a transparent plastic container (PET bottle) at 85° C. to obtain a containered green tea beverage.

Thereafter, the cap portion was sterilized while tumbling for 30 seconds, and immediately cooled.

[Manufacturing Method 3-2]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, coarsely filtered tea extract was forcibly cooled to 30° C., let to stand, then centrifugation Thereafter, the cap portion was sterilized while tumbling for 30 seconds, and immediately cooled.

[Manufacturing Method 3-3]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of two times with respect to the green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled.

[Manufacturing Method 3-4]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of two times with respect to the green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to kieselguhr filtration, using kieselguhr of 0.1 Darcy, non acid-treated product, to obtain a kieselguhr-filtered solution.

Then, 300 ppm of ascorbic acid was added to the kieselguhr-filtered solution, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled.

[Manufacturing Method 3-5]

Containered green tea beverage was manufactured as in the above-mentioned Manufacturing Method 3-4, except that acid-treated kieselguhr was used as kieselguhr used in kieselguhr filtration.

Acid treatment of kieselguhr was performed by immersing kieselguhr used in Manufacturing Method 3-3 in a 40-fold amount of hydrochloric acid solution (2.5% concentration), letting the solution to stand at room temperature for 24 hours with stirring, then, after washing with water until the filtrate reached pH 5, drying in a rotary drum.

The containered green tea beverages ([3-1]-[3-5]), manufactured as mentioned above, were conserved for 30 days in a thermostated bath at 37° C. or 55° C., and the status of sediment occurrence, water color, and flavor were observed and evaluated after 7, 14, and 30 days.

Evaluation of water color and flavor was determined through evaluation by 10 panelists.

In addition, evaluation of sediment was performed as in Test 1.

In case of long-term (30 days) hot storage, although occurrence of precipitation could be inhibited by increasing the clarification degree by performing silica adsorption followed by centrifugation, occurrence of turbidity was slightly observed (3-3).

In those whose clarity was further increased with kieselguhr, such turbidity was also not observed (3-5).

In addition, those filtered with kieselguhr that was not acid-treated discolored notably (3-4).

(Test 4: Evaluation of the Amount of Kieselguhr Filter Element Iron Eluted)

Kieselguhr filter element in the amount of 5 g was immersed in 100 ml of purified water (ion exchanged water) and the solution was made to stand at room temperature for 24 hours (stirred 5 times in the meantime); then, the filter element and purified water were separated by filtration, and the quantity of iron in the filtrate (purified water) was measured by a simple iron analyzer (coloration/optical density).

The result showed that the amount of eluted iron was 0.10 µg/g when converted into per gram of initial kieselguhr.

(Test 5: Measurement of Galacturonic Acid and Protein Content by Filtration Method)

[Manufacturing Method 5-1]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of 0 times, 0.5 times, 5 times, or 20 times with respect to the green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Table 3

Occurrence of sediment

| Manufacturing method | Storage temperature | After 7 days | After 14 days | After 30 days | Color of water | Flavor |
|---|---|---|---|---|---|---|
| 3-1 | 37° C. | − | ± | + | Slightly clouded | Comparatively poor |
|  | 55° C. | − | + | ++ | Slightly clouded | Poor |
| 3-2 | 37° C. | − | − | ± | Clear | Good |
|  | 55° C. | − | − | + | Slightly clouded | Comparatively poor |
| 3-3 | 37° C. | − | − | ± | Clear | Good |
|  | 55° C. | − | − | + | Slightly clouded | Comparatively poor |
| 3-4 | 37° C. | − | ± | Impossible to measure | Browned | Poor |
|  | 55° C. | ± | + | Impossible to measure | Browned | Poor |
| 3-5 | 37° C. | − | − | − | Clear | Good |
|  | 55° C. | − | − | − | Clear | Good |

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Manufacturing Method 5-2]

Extraction was performed for 3.5 minutes with 1000 ml hot water at 80° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of 0 times, 0.5 times, 5 times, or 20 times, with respect to the green tea source (tea leaves' mass), was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 $m^2$), using a Westfalia SA1 continuous centrifuge.

Then, the filtrate after centrifugation was subjected to kieselguhr filtration, using acid-treated kieselguhr of 0.1 Darcy, to obtain a kieselguhr-filtered solution.

Then, 300 ppm of ascorbic acid was added to the kieselguhr-filtered solution, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

In addition, acid treatment of kieselguhr was performed by immersing kieselguhr of 0.1 Darcy in a 40-fold amount of hydrochloric acid solution (2.5% concentration), letting the solution to stand at room temperature for 24 hours with stirring, then, after washing with water until the filtrate reached pH 5, drying in a rotary drum.

[Analysis of Galacturonic Acid]

A volume of 100 ml each of the containered green tea beverage samples obtained in Manufacturing Methods 5-1 and 5-2 was subjected to tannin removal by column chromatography (Sephadex LH-20), then concentrated 5 fold.

To 1 mL of the concentrated solution, 4 mL of ethanol was added and cooled overnight at −30° C.

After cooling, they were subjected to centrifugation, the supernatant was discarded, washed twice with ethanol, then exsiccated under reduced pressure to obtain analytical samples.

The analytical samples exsiccated under reduced pressure were dissolved in a total volume of 1 mL of distilled water; 5 mL of ice-cold 0.025 M sodium tetraborate was added and made to react for 10 minutes in hot water.

After the reaction, after cooling at room temperature, 200 μL of 7.5 mM carbazole was added, and the mixture was further made to react for 10 minutes in hot water.

After cooling at room temperature, optical density was measured at 530 nm (analytical apparatus: Hitachi spectrophotometer U-3310) to measure the galacturonic acid content.

Figure 2:
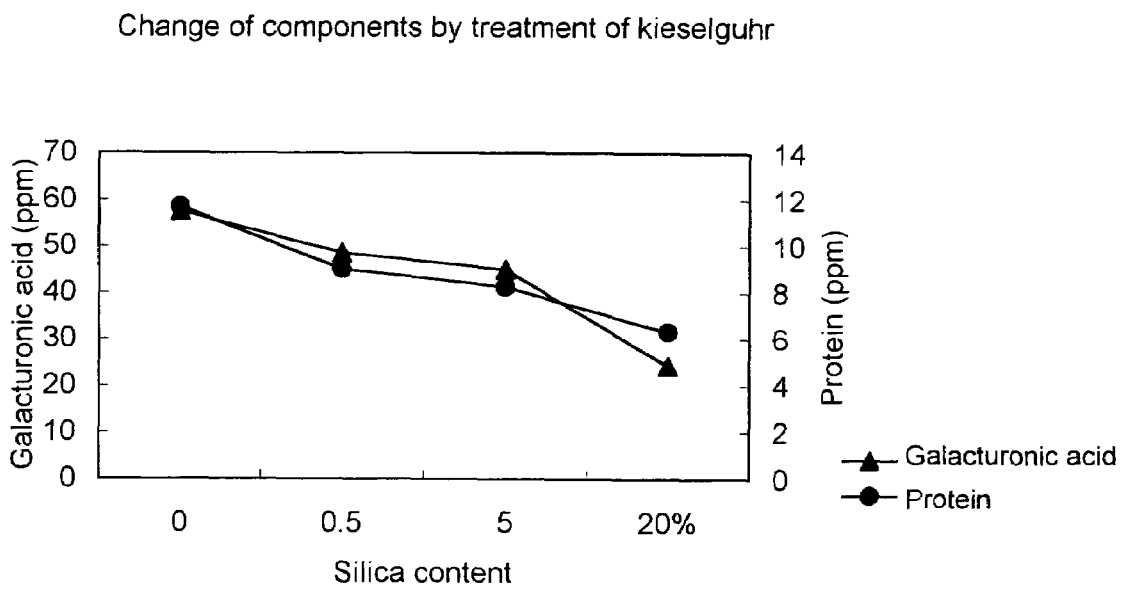
FIG. 2 is a graph showing the amounts of galacturonic acid and protein in a green tea beverage manufactured by centrifugation and kieselguhr filtration after the adsorption step, as a function of the amount of silica added.
Figure 3:
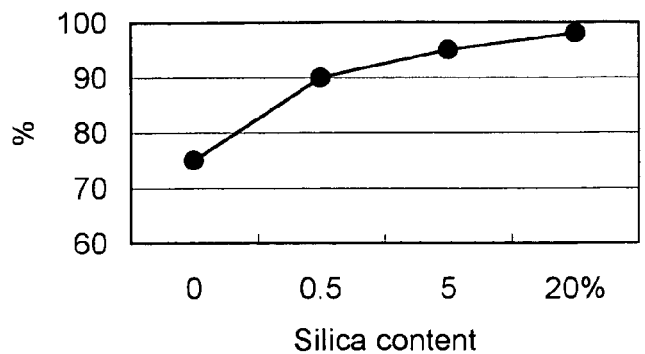
FIG. 3 is a graph showing the T % of a green tea beverage manufactured by centrifugation and kieselguhr filtration after the adsorption step, as a function of the amount of silica added.

The results are shown in FIG. 1 and FIG. 2.

[Analysis of Protein]

A volume of 100 ml each of the containered green tea beverage samples obtained in Manufacturing Methods 5-1 and 5-2 was subjected to tannin removal by column chromatography (Sephadex LH-20), then concentrated 5 fold.

To 1 mL of the concentrated solution, 4 mL of ethanol was added and cooled overnight at −30° C.

After cooling, they were subjected to centrifugation, the supernatant was discarded, washed twice with ethanol, then exsiccated under reduced pressure; further, proteins were precipitated with 15% trichloroacetic acid, to obtain samples for quantitative determination.

After dissolving the previously mentioned samples for quantitative determination in a total volume of 100 μL of distilled water, they were dissolved for over 30 minutes in 1 N NaOH.

After subsequent dissolution, 1 mL of sodium carbonate alkaline copper reagent was added and the solution was let to stand for over 10 minutes.

Thereafter, 100 μL Folin reagent was added and rapidly mixed, then the solution was let to stand for over 30 minutes, the optical density at 750 nm was measured (analytical apparatus: Hitachi spectrophotometer U-3310) to measure the protein content.

The results are shown in FIG. 1 and FIG. 2.

[T % Measurement]

Each containered green tea beverage sample (sample) obtained in the above-mentioned Manufacturing Method 5-2 was thoroughly shaken, and the transmittance (660 nm) was measured.

A volume of 4.0 ml was sampled in a standard glass cell and measured with a measurement apparatus: Hitachi spectrophotometer U-3310.

[Result]

By adding silica to tea extract and bringing them into contact, then centrifuging (Test 5-1), the amounts of galacturonic acid and protein after centrifugation were decreased, and the clarification degree also increased.

The same tendency as Test 5-1 was also seen in the case where after centrifugation, a further kieselguhr filtration was performed (Test 5-2).

Containered green tea beverage samples were created in the same way as Manufacturing Method 5-2, using non-acid treated kieselguhr, however, the analysis of galacturonic acid and protein thereof was impossible owing to notable discoloration and precipitation.

(Test 6: Measurement of Content by Filtration Method)

[Manufacturing Method 6-1]

Extraction was performed for 3.5 minutes with 1000 ml hot water at 85° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of 5 times with respect to the green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to kieselguhr filtration, using acid-treated kieselguhr of 0.1 Darcy, to obtain a kieselguhr-filtered solution.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

In addition, acid treatment of kieselguhr was performed by immersing kieselguhr of 0.1 Darcy in a 40-fold amount of hydrochloric acid solution (2.5% concentration), letting the solution to stand at room temperature for 24 hours with stirring, then, after washing with water until the filtrate reached pH 5, drying in a rotary drum.

[Manufacturing Method 6-2]

Extraction was performed for 3.5 minutes with 1000 ml hot water at 85° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, coarsely filtered tea extract was forcibly cooled to 30° C., let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to kieselguhr filtration, using kieselguhr of 0.1 Darcy, to obtain a kieselguhr-filtered solution.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Manufacturing Method 6-3]

Extraction was performed for 3.5 minutes with 1000 ml hot water at 85° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter; an amount of chitosan of 0.3 weight % with respect to the green tea source (tea leaves' mass) was added into a tank wherein coarsely filtered tea extract has been pooled.

After addition, tea extract (pH 5.0) was stirred for 15 minutes while forcibly being cooled to 30° C., so as to bring it sufficiently into contact with chitosan, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Manufacturing Method 6-4]

Extraction was performed for 3.5 minutes with 1000 ml hot water at 85° C. against 10 g of a green tea source (light-steamed green tea of 50:50 blended first crop of tea and second crop of tea of the cultivar "Yabukita" produced in Shizuoka).

The obtained tea extract was subjected to coarse filtration with an 80 mesh stainless filter, coarsely filtered tea extract was forcibly cooled so as to reach 30° C., then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to membrane treatment.

For the membrane treatment, membrane treatment apparatus (Nitto Denko Membrane Master) and Millipore UF membrane (100,000 fractionation) were used to perform membrane filtration at a processing pressure of 6 kg/cm$^2$.

Then, 300 ppm of ascorbic acid was added to the filtrate after membrane filtration, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Catechin Analysis Method]

The ratio of residual catechin was measured, by measuring the amount of catechin in each containered green tea beverage sample and taking the coarsely filtered tea extract as the control, as follows.

The results are shown in Table 4.

1) Devices and Instruments

High-performance liquid chromatography unit: Hitachi D-7000 HPLC system

HPLC column: YMC Jsphere ODS-H80 Ø4.6×250 mm

2) Reagents

Mobile phase: acetonitrile (for high-performance liquid chromatography or high grade), Phosphoric acid (high grade), ultra pure water (ion exchanged water treated with 0.45 μm)

Catechin standard solution: (−)-epigallocatechin gallate (EGCg), (−)-epicatechin gallate (ECg), (−)-epicatechin (EC), (−)-epigallocatechin (EGC), (−)-gallocatechin gallate (GCg), (−)-catechin gallate (Cg), (−)-gallocatechin (GC), (+)-catechin (C)

3) Sample Quantification Method

A volume of 5 ml of containered green tea beverage sample was measured accurately, placed in a 50 ml measuring flask, and the volume was adjusted with distilled water.

This was filtered through a 0.45 µm membrane filter and quantified by high-performance liquid chromatography.

Beforehand, the standard of each catechin was prepared on the order of 10-100 ppm, to determine a 3-point calibration curve.

4) High-Performance Liquid Chromatography Operation Conditions

Column: YMC Jsphere ODS-H80 Ø4.6×250 mm; column temperature: 40° C.

Mobile phase: gradient of phase A: 5% acetonitrile (containing 0.1% phosphoric acid) and phase B: 50% acetonitrile (containing 0.1% phosphoric acid)

Flow rate: 10 ml/min; injection volume: 10 µl; detection: UV230 nm

Table 4

|  | 6-1 | 6-2 | 6-3 | 6-4 |
|---|---|---|---|---|
| (+)- catechin | 95.88 | 96.85 | 74.41 | 95.60 |
| Ester catechin | 97.36 | 97.90 | 46.49 | 74.45 |
| Total catechin | 97.26 | 97.53 | 56.20 | 81.85 |

Although in the case where silica was added for adsorption (6-1), as well as in the case where kieselguhr filtration was performed (6-2), no decrease in the amount of catechin was seen, it is shown that in the case where chitosan was added (6-3), as well as in the case where membrane filtration was performed (6-4), the amount of catechin decreased.

(Test 7: Changes in Aroma Component by Filtration Method)

[Manufacturing method 7-1]

Extraction was performed for 3.5 minutes with 1000 ml hot water at 85° C. against 10 g of a green tea source (refined tea obtained by roast-drying light-steamed green tea of 50:50 blended first crop of tea and second crop of tea of the cultivar "Yabukita" produced in Shizuoka).

The obtained tea extract was subjected to coarse filtration with an 80 mesh stainless filter, coarsely filtered tea extract was forcibly cooled so as to reach 30° C., then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation and adjusted to pH 6 with sodium bicarbonate.

Then, adjustment to 1000 ml (fill up) was performed by adding ion exchanged water, then UHT sterilization (135° C., 30 seconds) was performed, cooled inside a plate, and filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Manufacturing Method 7-2]

Extraction was performed for 3.5 minutes with 1000 ml hot water at 85° C. against 10 g of a green tea source (refined tea obtained by dry-roasting light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of 5 times with respect to the green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, 300 ppm of ascorbic acid was added to the filtrate after centrifugation, adjusted to pH 6 with sodium bicarbonate, and adjusted to 1000 ml (fill up) by adding ion exchanged water, then UHT sterilization (135° C., 30 seconds) was performed, cooled inside a plate, and filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

[Manufacturing Method 7-3]

Extraction was performed for 3.5 minutes with 1000 ml hot water at 85° C. against 10 g of a green tea source (refined tea obtained by dry-roasting light-steamed green tea of 50:50 blended first crop of tea and second crop of tea of the cultivar "Yabukita" produced in Shizuoka).

The obtained tea extract was subjected to coarse filtration with an 80 mesh stainless filter, an amount of silica (noncrystalline hydrous silica; Mizusawa Industrial Chemicals, Ltd., Mizuka Soap) of 5 times with respect to green tea source (tea leaves' mass) was added into a tank wherein coarsely filtered tea extract has been pooled, tea extract (pH 5.0) was stirred for 15 minutes while forcibly being cooled to 30° C., so as to bring it sufficiently into contact with silica, let to stand, then centrifugation was performed (flow rate: 300 L/h; rotation speed: 10000 rpm; centrifugal sedimentation surface ($\Sigma$): 1000 m$^2$), using a Westfalia SA1 continuous centrifuge.

Then, the filtrate after centrifugation was subjected to kieselguhr filtration, using acid-treated kieselguhr of 0.1 Darcy, to obtain a kieselguhr-filtered solution.

Then, 300 ppm of ascorbic acid was added to the kieselguhr-filtered solution, adjusted to pH 6 with sodium bicarbonate, and adjusted to 1000 ml (fill up) by adding ion exchanged water, then UHT sterilization (135° C., 30 seconds) was performed, cooled inside a plate, filled into a transparent plastic container (PET bottle) at 85° C. to obtain a containered green tea beverage.

Thereafter, the cap portion was sterilized while tumbling for 30 seconds, and immediately cooled to obtain a containered green tea beverage.

In addition, acid treatment of kieselguhr was performed by immersing kieselguhr of 0.1 Darcy in a 40-fold amount of hydrochloric acid solution (2.5% concentration), letting the solution to stand at room temperature for 24 hours with stirring, then, after washing with water until the filtrate reached pH 5, drying in a rotary drum.

[Aroma Component Analysis Method]

Containered green tea beverage sample was taken in a 10 ml vial bottle, and 3 g of NaCl was added.

5 µl of 0.1% cyclohexanol was added as an internal standard.

Figure 4:
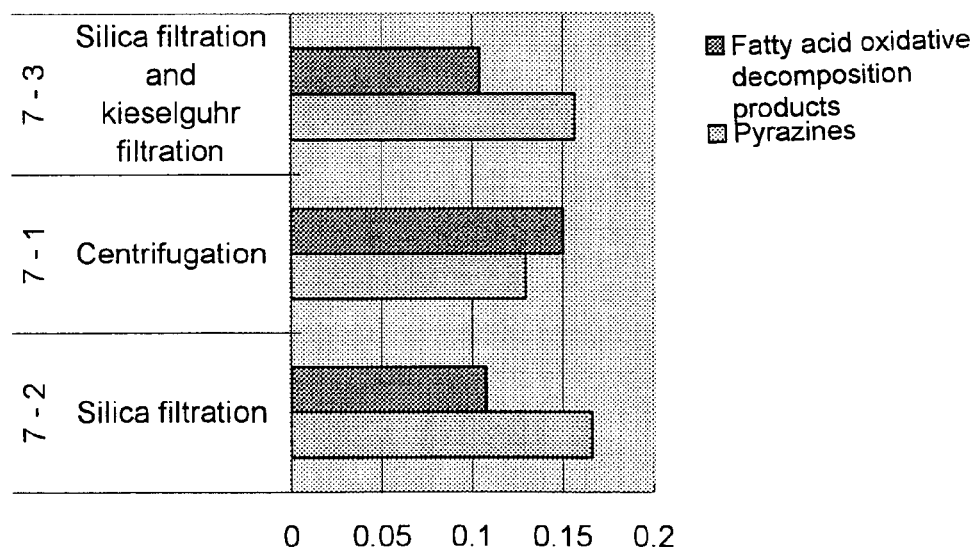
FIG. 4 is a graph showing the amount of aroma compounds (pyrazines, fatty acid oxidative decomposition product) contained in a green tea beverage manufactured by different filtration methods.

For the extraction of aroma component, the solid phase microextraction (SPME) method was employed, and the analysis was performed by GC/MS; the results are shown in FIG. 4.

The amount of aroma component was determined as a relative ratio by taking the surface of the internal standard substance (5 μL of 0.1% cyclohexanol) as 1.

(Analysis Conditions)

GC/MS: Agilent 5973N,

Column: DB-WAX (0.25 mm I.D.×60 m×0.25 μm),

Flow rate: 0.9 ml/min,

Oven temperature: 35° C. (3 min)-5° C./min-240° C. (5 min),

Injection temperature: −50° C.-12° C./s-240° C., splitless

[Result]

In the case where silica was added for adsorption (7-2), as well as the case where a further kieselguhr filtration was performed (7-3), a tendency was observed where pyrazines were numerous and fatty acid oxidative decomposition products decreased, compared to the case with centrifugation alone (7-1).

What is claimed is:

1. A method for manufacturing containered green tea beverage
   having catechin content, wherein said method comprises:
   an extraction step wherein green tea leaves are extracted in hot water at 70-100° C., said extraction step resulting in a green tea extract;
   an adsorption step wherein after adding silica to the tea extract, said tea extract is brought into contact with silica while being cooled so as to reach 20-40° C. to absorb formulation components of a secondary sediment present in the green tea extract to said silica;
   a silica elimination step wherein the silica is eliminated from the green tea extract;
   a sterilization step; and
   a container filling step.

2. The method for manufacturing containered green tea beverage of claim 1, wherein the containered green tea beverage is a containered green tea beverage that is to be sold hot, in a state that maintains 55-60° C.

3. The method for manufacturing containered green tea beverage of claim 1 or 2, wherein the amount of silica added is 0.5-20 times the mass of tea leaves to be extracted.

4. The method for manufacturing containered green tea beverage of claim 1 or 2, wherein at the adsorption step, silica is added to a tea extract that has been adjusted to pH 4.5-5.5.

5. The method for manufacturing containered green tea beverage of claim 1 or 2, including a filtration step for obtaining clarification degree of a transmittance (660 nm) of 95 T % and more.

6. The method for manufacturing containered green tea beverage of claim 1 or 2, wherein at the step following the silica elimination step, kieselguhr filtration is performed using acid-treated kieselguhr.

7. The method for manufacturing containered green tea beverage of claim 1 or 2, wherein after the green tea leaves are extracted in hot water at 70-100° C., an obtained green tea extract is subjected to coarse filtration,
   wherein during said adsorption step, silica is added to coarsely filtered green tea extract and
   wherein during said silica elimination step, silica is eliminated from the coarsely filtered green tea extract by centrifugation or other filtration method.

8. The method for manufacturing containered green tea beverage of claim 1 or 2, wherein after the green tea leaves are extracted in hot water at 70-100° C., an obtained green tea extract is subjected to coarse filtration,
   wherein during said adsorption step, silica is added to coarsely filtered green tea extract, and
   wherein during said silica elimination step, silica is eliminated from the coarsely filtered green tea extract by centrifugation, then kieselguhr filtration is performed using acid treated kieselguhr.

9. The method for manufacturing containered green tea beverage of claim 1 or 2, further comprising a coarse filtration step wherein extract residues are removed from the green tea extract prior to said adsorption step, and wherein said silica elimination step comprises a silica-eliminating centrifugation step wherein said silica is eliminated from the green tea extract.

10. The method for manufacturing containered green tea beverage of claim 9, further comprising a kieselguhr filtration step following said centrifugation step.

* * * * *